Nov. 30 1943.  C. H. SCOTT  2,335,573
BAR SCREEN CLEANING MECHANISM
Filed Sept. 21, 1940  6 Sheets-Sheet 1
FIG.1.
FIG.2.
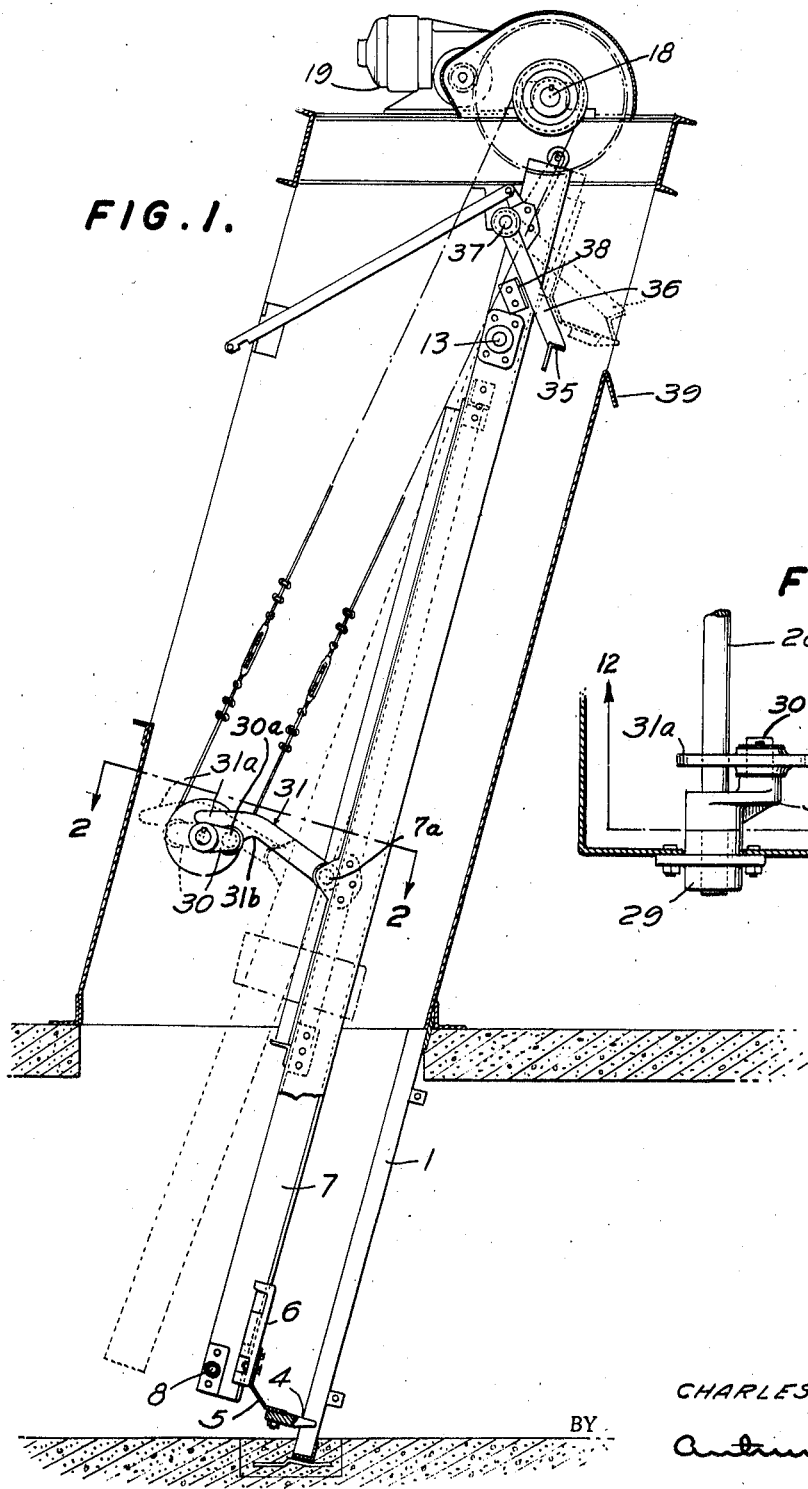
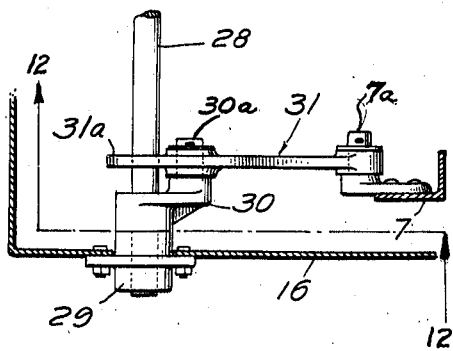
INVENTOR.
CHARLES H. SCOTT,
BY
ATTORNEY.

Nov. 30, 1943.                C. H. SCOTT                2,335,573
                       BAR SCREEN CLEANING MECHANISM
                          Filed Sept. 21, 1940           6 Sheets-Sheet 2
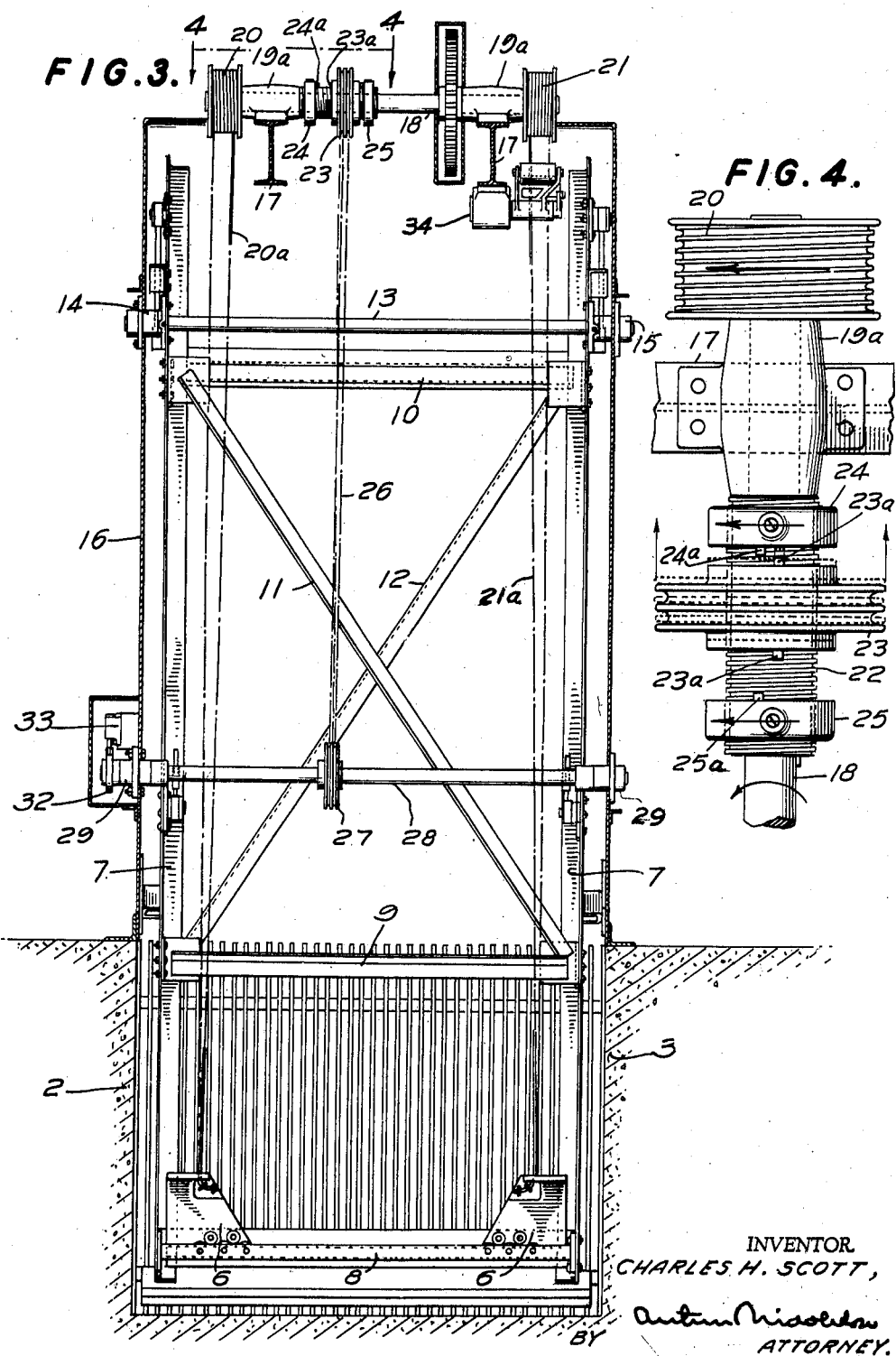
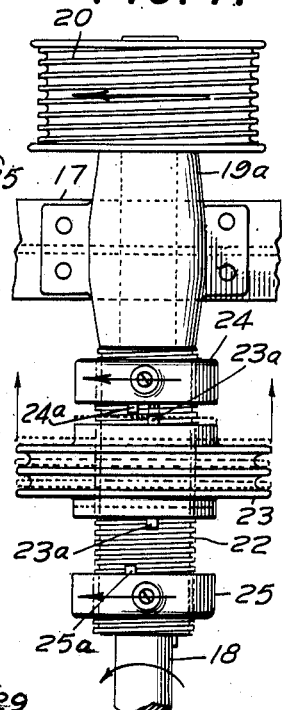
INVENTOR.
CHARLES H. SCOTT,
BY
ATTORNEY.

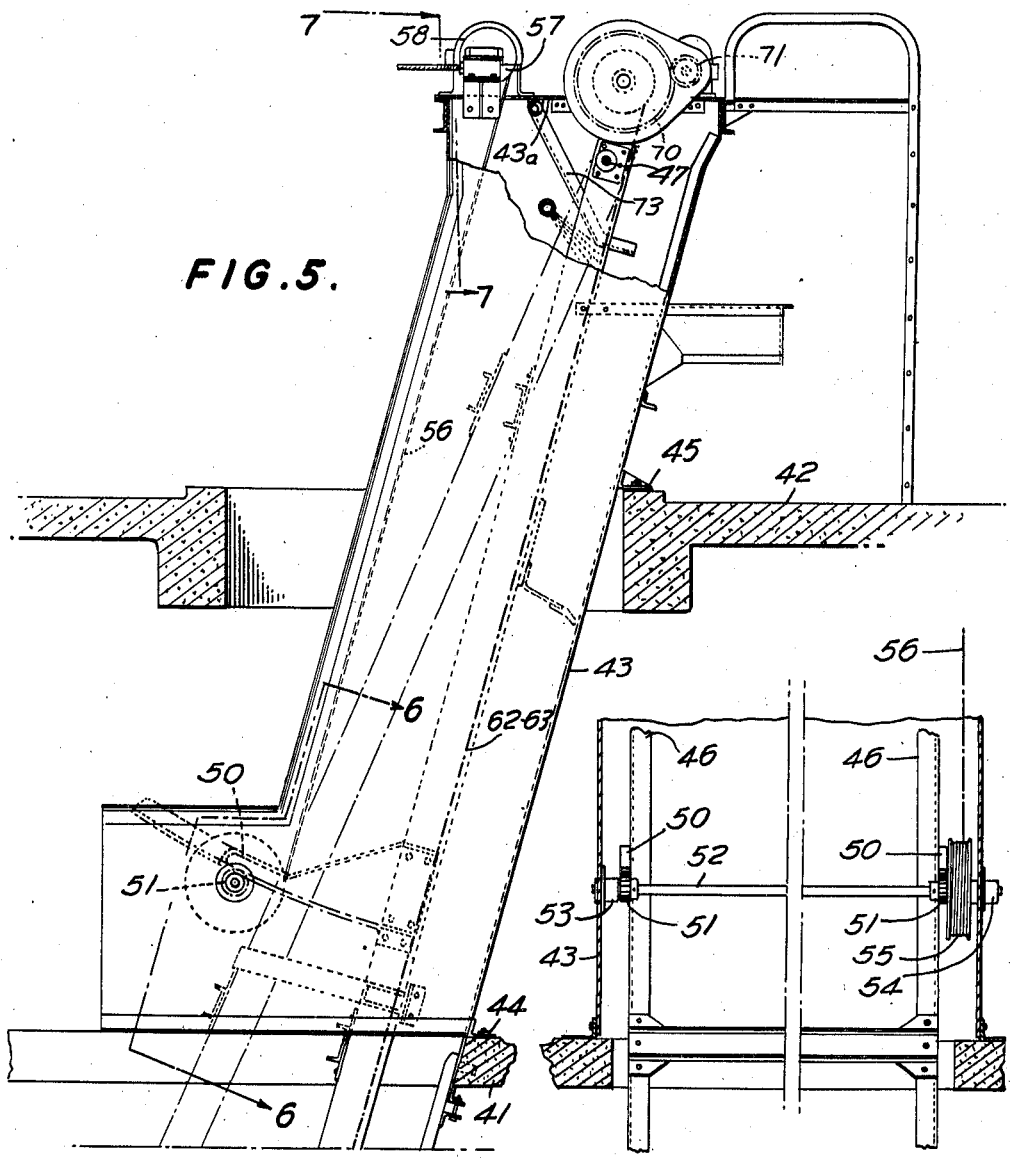

Nov. 30 1943.   C. H. SCOTT   2,335,573
BAR SCREEN CLEANING MECHANISM
Filed Sept. 21, 1940   6 Sheets-Sheet 4

INVENTOR.
CHARLES H. SCOTT,
BY
ATTORNEY.

Nov. 30 1943.    C. H. SCOTT    2,335,573
BAR SCREEN CLEANING MECHANISM
Filed Sept. 21, 1940    6 Sheets-Sheet 5

INVENTOR
CHARLES H. SCOTT,
BY
ATTORNEY.

Nov. 30 1943.　　　C. H. SCOTT　　　2,335,573
BAR SCREEN CLEANING MECHANISM
Filed Sept. 21, 1940　　6 Sheets-Sheet 6
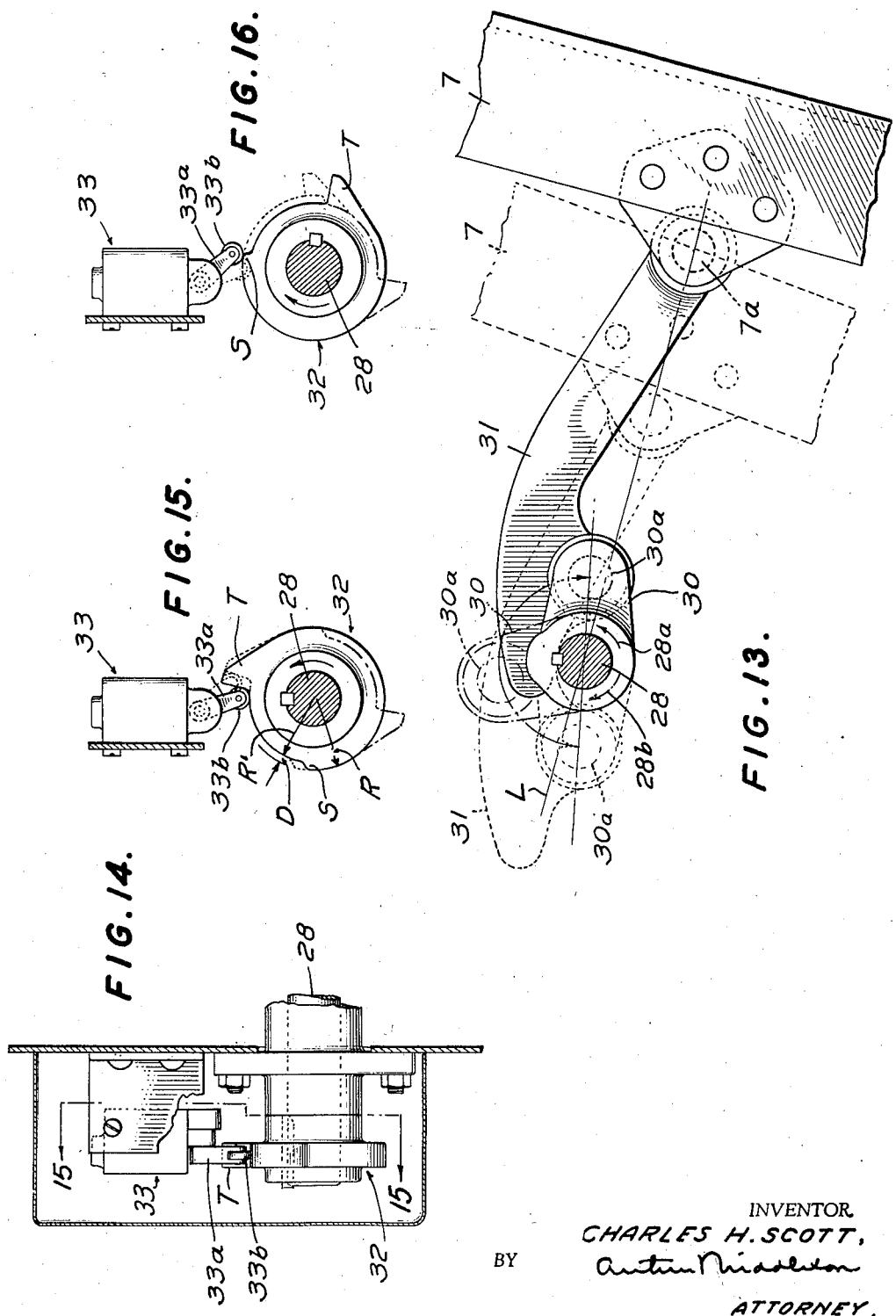
INVENTOR.
CHARLES H. SCOTT,
BY
ATTORNEY.

Patented Nov. 30, 1943

2,335,573

UNITED STATES PATENT OFFICE 2,335,573

BAR SCREEN CLEANING MECHANISM

Charles H. Scott, Westport, Conn., assignor to The Dorr Company, New York, N. Y., a corporation of Delaware Application September 21, 1940, Serial No. 357,700

10 Claims. (Cl. 210—176)

This invention relates to screening apparatus for sewage and other liquids of the kind comprising a grid structure or so-called bar screen and a device movable over the screen for the purpose of removing therefrom the accumulated solid material. Such cleaning device is preferably in the form of a rake the teeth of which extend into the spaces between the bars of the grid or screen.

The main object of the invention is to provide improved means for actuating and controlling the cleaning device in an apparatus of the kind referred to, and another object is to provide an improved arrangement for causing the cleaning device or rake to leave the screen during a part of its cycle of movement; in other words, to provide improved track lifting mechanism for the rake. Other objects comprise the provision of a screen cleaning device which is quiet in operation, not liable to jamming between the rake and the screen bars, and which affords a large lift with relatively low headroom.

According to the invention the cleaning device or rake is guided by track means or a track construction adapted to be displaced or tilted or swung to cause the rake to leave the screen, the rake being slidable up and down the tracks. The movements of the tracks and of the rake respectively are coordinated so that the rake is raised when the tracks are lowered permitting the rake to engage the screen, and lowered when the tracks are swung away from the screen.

Some of the broader features of the invention lie in a system or systems of control of the movements of the rake and of the track construction by each other.

According to one of these features the movements of the rake and of the tracks respectively are coordinated or coupled electrically, or part electrically and part mechanically; that is to say, the rake and the track construction are coupled in a manner whereby limit switch means actuated by the one in turn influences the other, so as to establish an automatic operating cycle of the mechanism.

In one form of the invention the guide means comprises rails or tracks or a track frame construction pivoted for movement towards and away from the screen, and actuated by a toggle or overthrow device which may conveniently comprise a link forming a connection between the guide rail means and a crank which is movable through 180° to actuate the guide means. The arrangement is such that in the two limiting positions the crank is self-locking. At the same time provision is made to avoid jamming between the rake and the screen bars by allowing for a lost motion phase in the actuation of the toggle device.

The invention also consists in a screening apparatus of the kind described in which the cleaning device is alternately raised and lowered by cable means wound upon a drum, and the control of the actuation of the guide means for the cleaning device is effected through the medium of screw means rotatable with the drum causing the travel of a control or actuating member as the drum rotates. According to one form of the invention the cable drum or drums by which the cleaning rake is operated are mounted on a shaft which also carries a lost motion device in the form of a screw sleeve on which is threaded a toggle actuating sheave. As the drums rotate the sheave travels endwise along the screw sleeve until it engages one of two stops and then rotates with the shaft to actuate the toggle means which effects the displacement of the guide means or tracks for the cleaning device or rake.

According to a further feature of the invention, the drive of the drum means which operates the cleaning device or rake is controlled by the operation of the means which effects the displacement of the guides for the rake. In other words, the overthrow of the toggle device while lowering the guide tracks also starts the rake lifting motor. Thus, according to a convenient arrangement where the guides or tracks are displaced by toggle means, the toggle shaft carries a cam or other actuating member for a reversing switch controlling the driving motor. It is therefore a feature of this arrangement that the reversing of the drive is effected after the tracks for the cleaning device have been displaced and under the control of the means, i. e. the cable drum or drums, which effect the movement of the cleaning device.

According to a further feature of the invention, the guide means for the cleaning device or rake are arranged to return to screen cleaning position under the controlling action of gravity.

According to a further feature of the invention, the cleaning device is actuated by cable means and the drive of such means is controlled by means dependent upon the degree of tautness of the cable. Such means may comprise, for example, a so-called slack cable switch, a switch actuating arm being held in one position by the cable and moving to another position if the cable should become slack for any reason. Such movement is utilized to actuate the switch through cam or other means and thereby interrupt the drive of the cable and hence the operation of the cleaning device or rake.

According to a further feature of the invention, the drive of the cleaning device, which may include any of the features set forth in preceding paragraphs, is controlled by switch means located above the level of the liquid passing through the screen. In one embodiment this is ensured by actuating such switch from the means for displacing the tracks for the cleaning device, such means being themselves located above the highest liquid level.

Other features have to do with an automatic drive and control system in which separate drive motors are provided for the guide tracks and for the rake respectively, and in which the movements of the guide tracks and of the rake are coordinated and interlocked by way of a special system or combination of limit switches, the function of which will maintain the operating cycle of the rake cleaning device.

According to one of these features, a limit switch herein to be termed a combination limit switch because of its dual function, is provided, which when struck by the upper limit position of the rake will reverse the rake lifting motor, as well as start the track motor to lift the tracks.

According to another of these features, the movement of the guide tracks is coupled with a screw limit switch in such a manner that in its one end position the switch will stop the track lifting motor when the tracks have lifted to the limit, and in its other end position the switch will start the rake motor to lift irrespective of whether at that time the tracks have actually reached their final lowered position, or whether they have been arrested midway due to some obstruction on the screen bars.

Still another of these features lies in the provision of a so-called slack cable switch which is also a combination switch because of its dual function. This switch operates when the rake reaches it lower stop on the tracks, and it will stop the lowering movement of the rake motor and also start the track motor to lower the track.

The invention possesses other objects and features of advantage some of which, with the foregoing, will be set forth in the following description. In the following description and in the claims parts will be identified by specific names for convenience, but they are intended to be as generic in their application to similar parts as the art will permit. In the accompanying drawings there has been illustrated the best embodiment of the invention known to me, but such embodiment is to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings in which:

Fig. 1 is a side elevation partly in section of one form of a bar screen cleaner embodying the invention and having a single drive motor effecting the movement of both the rake and the guide tracks therefor.

Fig. 2 is an enlarged detail view of mechanism for displacing the guide tracks, taken upon the sections 2—2 in Fig. 1.

Fig. 3 is a front elevation of the bar screen cleaner shown in Fig. 1.

Fig. 4 is an enlarged detail view of a lost motion device for deriving and controlling the movements of the guide tracks from the drive for the rake.

Fig. 5 is a side view partly in section of another embodiment of a bar screen cleaner according to the invention, and having separate drive motors for actuating the rake and the guide tracks respectively, the motors being functionally coupled with one another by way of a system of limit switches.

Fig. 6 is a section along the line 6—6 of Fig. 5 showing a modified arrangement of the track lifting means.

Fig. 13 is an enlarged detail side view on the line 12—12 of the toggle link connection shown in Fig. 2, and illustrating both extreme operation positions of the toggle link.

Fig. 14 is an enlarged detail view of the switch device shown in Fig. 3 to be associated with the operation of the toggle links.

Fig. 15 is a section along the line 15—15 in Fig. 14, showing one limit position of the motor reversing switch.

Fig. 16 is a view similar to that of Fig. 15, and shows the other limit position of the switch.

Figure 7:
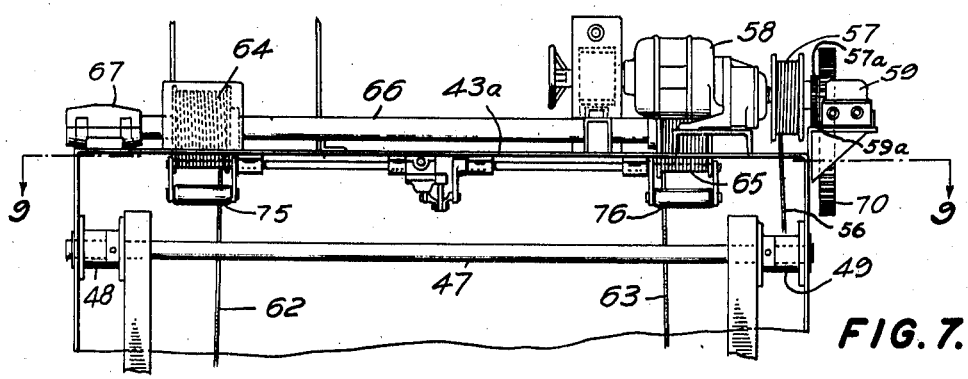
Fig. 7 is a section along the line 7—7 in Fig. 5 showing the top portion of the bar screen cleaner, provided with a slack cable switch arrangement to stop rake lowering and to start track lifting.
Figure 8:
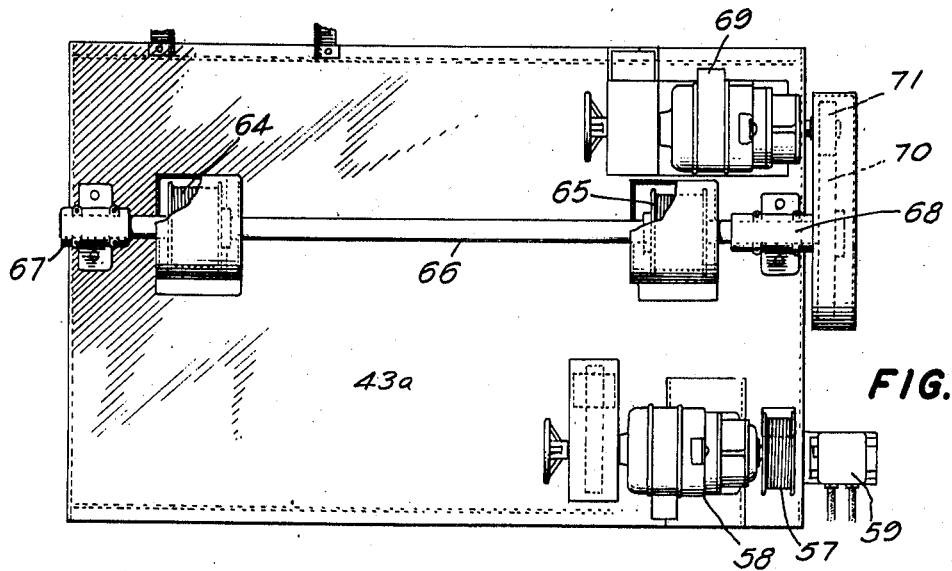
Fig. 8 is a top view with parts in section, taken upon Fig. 5, showing the arrangement of separate motors for actuating the rake and the guide tracks respectively.
Figure 9:
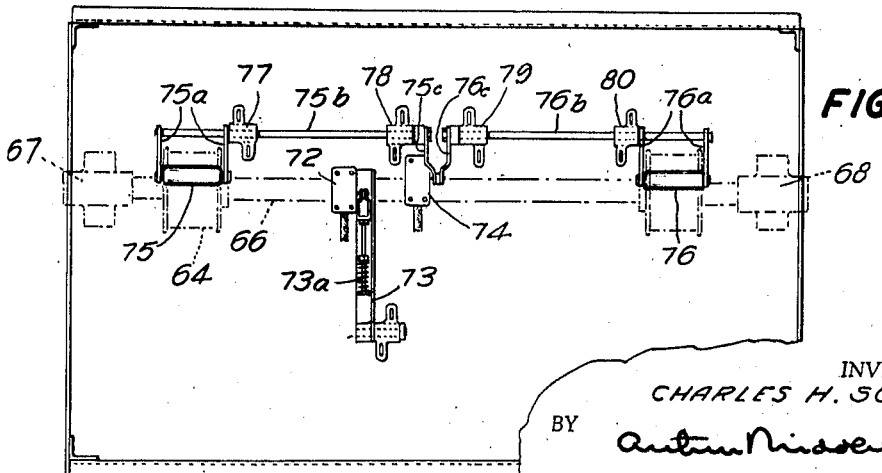
Fig. 9 is a section along the line 9—9 in Fig. 7 showing details of the slack cable switch arrangement.

The bar screen consists of a series of vertical bars 1 disposed at an angle of about fifteen degrees to the vertical in a channel defined by walls 2 and 3. The rake member for cleaning the bar rack consists of a series of teeth 4 carried by a transverse bar 5 and extending into the spaces between the bars, and this rake member as a whole is designated by a numeral 5a. At either end of the bar 5 there is a rake guide member 6 which slidably engages with a guide rail 7. The two guide rails or tracks or track members are connected by cross members 8, 9 and 10 and cross braces 11 and 12, the whole structure being carried at its upper end upon a pivot shaft 13 rotatable in bearings 14 and 15. These bearings are mounted in a housing or framework which is indicated generally at 16.

Supporting beams 17 at the upper end of the housing carry a drum shaft 18 which is driven through gearing from an electric motor 19 and supported in journal bearings 19a upon the beams 17. A pair of drums 20 and 21 grooved for steel cables 20a and 21a are mounted at each end of the shaft and the cables are attached to the rake guide members 6. A sleeve 22 threaded throughout its length is secured to the shaft and a sheave 23 having projections 23a is threaded upon the sleeve. Travel of the sheave along the sleeve by rotation of the latter is limited by collars 24 and 25 carrying projections 24a and 25a. A cable 26 passes around the sheave 23 and a second sheave 27 on a shaft 28 carried in bearings 29 mounted in the main casing or framework 16. A toggle crank 30 secured near each end of the shaft 28, and having a crank pin 30a is connected by means of a toggle link 31 at 7a with the rake guide rail 7. The toggle link 31 has a free end portion 31a which engages the shaft 28, thus determining the lowered position of the guide rails 7. The toggle link 31 has a gouge 31b which is designed to engage the shaft 28 when the crank has been swung over from its full line position to its dotted line position (see Fig. 1). It will be noted that the (dotted line) throw position of the toggle crank 30 determining the raised position of guide tracks 7, is such that the shaft 28 will engage the gouge 31b only after the crank 30 has moved somewhat past its dead center position with regard to the hinge point 7a of the toggle link 31. This in a way locks the tracks 7 in their raised position until the crank 30 is swung back again towards its (full line) position for lowering the tracks 7. It will be noted that the tracks will tend to lower themselves by their very weight as soon as the crank 30 has passed through its dead center with respect to point 7a. A cam member 32 mounted at one end of the shaft 28 actuates a limit switch 33 having two sets of contacts. A so-called slack cable switch 34 in this embodiment is arranged as a safeguard to be operated by the cable 21a when for any reason the cable becomes slack, as may happen if, for example, the rake became jammed in the screen during its descent. Such safety switch may comprise an arm carrying a roller which is normally held pressed against the cable. If the cable should become slack, the arm is displaced and operates the switch to stop the driving motor.

A rake scraper 35 is mounted on a pair of arms 36 pivoted at 37 on the guide rails 7 and these arms normally rest upon stops 38. This scraper is positioned so as to be operated by the rake 4, 5 and 6, as the latter is raised to the dotted line position shown in Fig. 1. As the rake moves upwardly the scraper 35 is moved upwardly and laterally and the accumulated screenings on the rake are pushed off the rake to a discharge hopper or chute indicated at 39. As the rake 4, 5, and 6 descends during its idle stroke, the scraper 35 lowers gently to its initial position on the stops 38.

In the operation of the embodiment according to Figs. 1 to 4, supposing the rake 4, 5, 6 to be at its lowest position, upon starting up the motor 19 the rake will be raised and will move up along the screen 1 and remove accumulated solids therefrom. Movement of the rake will continue until it reaches the upper end of the guide structure or tracks 7. Meanwhile the threaded sheave 23 will travel lengthwise upon the threaded sleeve 22 until it engages with one of the collars 24, 25 thereon, when the sheave 23 will be rotated and will operate the toggle device 30, 31 to displace the guide rail structure 7 away from the screen 1, and then to reverse the main motor switch by actuating the limit switch 33 through the rotation of the cam 32, causing the rake 4, 5, 6 to descend to the lower end of the guide rail structure, at which point the operation will be reversed in a similar manner.

The limit switch 33 and the switch controlling cam member 32 are shown in greater detail in Figs. 14 to 16, the limit switch 33 having a switch actuating member 33a upon which is mounted a cam roller 33b whereby the switch may be thrown. The enlarged detail Figs. 14 to 16 will also serve to show in what manner the operating positions of the cam member 32 are coordinated to the operating positions of the switch actuated member 33a, and to the corresponding operating positions of the toggle links 31 as indicated in the enlarged detail side view thereof in Fig. 13.

Basically the cam member 32 comprises a disc or body portion of the radius R, having a recess P extending marginally along the body portion, the depth of the recess being defined by the difference of the radii R and R'. The depth of the recess itself being identified by the letter D. This recess is limited at one end and extends over roughly a quarter of the circumference of the cam body portion and is limited at one end by a cam portion or step S and at the other end by a projection or tooth T. The full-line position of the cam member 32 and of the switch actuating member 33a correspond to the full-line position of the toggle links 31 in Fig. 12, whereas the dotted-line position of the switch member 33a and the dot-and-dash-line position of the cam member 32 (see Fig. 15) correspond to the dotted-line position of toggle links 31 (see Fig. 13).

The dead center line underlying the operation of the toggle links 31 is the center-to-center line L between shaft 28 and pivot point 7a. From Fig. 13 it will be noted that in the full-line position of toggle link 31, that is when the tracks 7 are in lowered position, the center of the crank pin 30a lies somewhat above the dead center line L, whereas in the dotted-line position of the toggle links 31, that is when the tracks 7 are in raised position, the center of the crank pin 30 lies somewhat below the center line L.

Consequently, with reference to Figs. 13 to 16, the operating cycle of the apparatus of Figs. 1 to 4 may be kinematically more precisely described as follows: Let it be assumed that the tracks 7 are in lowered position, namely in the full-line position shown in Figs. 1 and 13, and further that the motor 19 rotates the rope winding drums 20 and 21 so as to raise the rake member 5a along the track rails 7 while operatively engaged upon the screen bars 1. Towards the end of this upward movement of the rake member 5a the lost motion between the threaded sleeve 22 and the sheave 23 will have been absorbed, causing the sheave 23 to rotate and through the endless cable 26 in turn to transmit its rotation to the second sheave 27 and thus to the shaft 28. When the rotation of the shaft 28 starts, the crank pin 30a will be in the full-line position of Fig. 13, while the cam member 32 will be in the dot-and-dash-line position of Fig. 15. The rotation of the shaft 28 in the direction of arrow 28a (see Fig. 13) will bring the tooth T of the cam member 32 from its dot-and-dash-line position (see Fig. 15) to an intermediate position indicated in dotted lines in Fig. 15. This dotted-line position of the tooth T approximately coincides with the dead center position of the crank pin 30 and at this point or a little past it, the tooth T of the cam member 32 engages the cam roller 33b of the switch 33. With the crank pin 30a now just about past dead center, the weight of the tracks 7 will tend to positively actuate the switch member 33a, forcibly bringing it to its full-line position (Fig. 15), and thereby reversing the driving motor 19.

Consequently, with the tracks 7 in a raised position, the motor 19 will now lower the rake member 5a without affecting the position of the tracks 7 until towards the lower end of its travel, when the lost motion of the sheave 23 on the threaded sleeve member 22 will again have been absorbed, thus causing a rotation of the shaft 28 and of cam member 32 in the direction of the dotted-line arrow 28b.

Thus the cam member 32 will rotate from its full-line position in Fig. 15 through about 90° to the dotted-line position of the tooth T in Fig. 16, at which time the cam portion or step S will have reached the cam roller 33b shown in dotted lines in Fig. 16. At this point the crank 30 will be in the intermediate position shown in dot-and-dash-line in Fig. 13. The weight of the tracks 7 tending to continue the rotation of shaft 28 through the toggle links 31 will then make sure that the switch actuating member 28a is thrown from its dotted-line position to its full-line position (Fig. 16) as the cam roller 33b rides up on the step S, and the cam member 32 continues in what may be called its overtravel until the tooth T has again reached its dot-and-dash-line position indicated in Fig. 16 and also in Fig. 15, which position of the cam member corresponds to the full-line position of the toggle link 31 and of the tracks 7 in Fig. 13. With the operating cycle thus closed, the motor 19 is again reversed incident to the throwing of switch 33 as just described. It should be noted that the overtravel just mentioned and provided for in the rotation of the cam member 32 will permit the rake member 5a to override obstacles which it may encounter initially at the bottom of the screen bars, without otherwise interfering with the renewed upward movement of the rake member 5a along the screen bars.

The embodiment of the bar screen cleaning mechanism according to Figs. 5 to 9 will now be described:

According to Fig. 5 the channel through which flows the liquid to be screened, such as sewage, has a bottom 40 and a top 41. Screen bars extending from the top to the bottom of the channel are shown at 41a, having curved lower end portions 41b merging somewhat tangentially with the channel bottom.

At an elevation above the channel top 41 is shown an operating floor 42. The mechanism is housed and supported in a casing 43 which is shown to be mounted upon the channel top 41 as at 44, and upon the operating floor 42 as at 45, which casing 43 has a top cover plate 43a. Disposed within the casing and operatively supported thereby are guide tracks 46 constituting a swingable frame construction mounted by way of a shaft 47 in journals 48 and 49 in the casing 43.

Up and down the guide tracks 46 is slidable a rake member 60 having teeth 61 adapted to engage in the spaces between the screen bars 41a. The rake member 60 is actuated by a pair of ropes 62 and 63 upon a corresponding pair of drums 64 and 65 fixed upon a drum shaft 66 mounted in journals 67 and 68 upon the top cover plate 43a of the casing 43. The drum shaft 66 is driven by a motor 69 herein termed the rake motor or rake lifting motor, by way of gears indicated at 70 and 71.

The rake lifting mechanism just described is cooperatively associated with limit switch means 72 which are engaged by way of an actuating arm 73 by the rake reaching its uppermost position. This will cause the rake motor to be reversed, and will moreover start the track motor 58 to start track lifting. For the protection of the switch there is provided a spring arrangement 73a to absorb excess movement of the switch actuating arm 73.

The rake lifting mechanism has furthermore cooperatively associated therewith a so-called slack cable switch 74 which for the present purpose is designed to stop the rake motor after the rake has reached its bottom position on the guide tracks, due to the then slackening of the ropes 62 and 63, as well as to start the track motor for lowering the tracks.

It will be noted from Fig. 7 that the screw limit switch 59 is geared up with the rope winding drum 57 by way of gears 59a and 57a. The screw limit switch is so called because a rotary screw member contained in the switch and connected with the gear 57a by its rotation imparts positive movement or travel to a switch member also contained in the switch. Depending upon the direction of rotation of the screw member and depending upon the amount of its rotation, the switch member will be caused to travel between certain limits which are set up to correspond substantially to the limits of movement of the tracks 7. It may thus be said that the switch member of the screw limit switch moves substantially in unison with the tracks 7.

The slack cable switch 74 is actuated by a pair of contact rollers 75 and 76 engaging upon the rake lifting ropes 62 and 63 respectively. The rollers are carried by arms 75a and 76a respectively, which in turn are fastened upon a rocker shaft 75b and 76b respectively mounted in a series of suitable bearings or journals 77, 78, 79, 80 fastened to the underside of the top cover plate 43a of casing 43. The inner ends of the rocker shafts have arms 75c and 76c respectively, whereby to actuate the slack cable switch 74. This symmetrical arrangement of contact rollers and switch actuating means is adapted to operate in such a manner that the slackening of either or both of the ropes 62 or 63, per se, will cause the slack cable switch 74 to function.

Mechanism for moving the guide tracks to and away from the screen bars 41a in the present embodiment comprises a pair of arcuate racks 50 driven by a corresponding pair of pinions 51 fixed on a shaft 52 mounted in journals 53 and 54 supported by the walls of the casing 43. The shaft 52 is rotated by a secondary rope winding drum 55 actuated by a rope 56, the upper end of which is wound upon a primary rope winding drum 57 supported and driven by a reduction gear motor 58 herein termed the track motor or track lifting motor which is mounted upon the top cover plate 43a.

The track lifting mechanism is cooperatively associated with a screw limit switch 59 which on the one hand stops the track lifting motor 58 when the tracks have been lifted to their upper limit, and on the other hand, to stop the track motor at a point corresponding to the lowered position of the tracks, as well as to start the rake motor 69 to lift the rake.

The operation or operating cycle of the bar screen cleaning mechanism according to Figs. 5 to 9 is as follows:

Assuming the guide tracks 46 are in their lowered position, namely parallel to the screen bars 41a, while the rake travels upwardly as the rake motor 69 functions.

When the rake 60 engages the actuating arm 73 of the limit switch 72, there will result a reversal of the rake motor to start lowering the rake while the track motor is started to begin with the lifting of the tracks 46 from their operative position to their inoperative (dot and dash) position (see Fig. 5), so that during this phase rake lowering and track lifting proceed simultaneously.

Now, when the tracks 46 have reached the upper limit in their movement away from the screen, the screw limit switch, being timed with the ends of a predetermined track movement, will function at this time to stop the track lifting motor 58, while the rake is allowed to continue its lowering movement. Then after the rake 60 reaches a lower limit position indicated by the numeral 60a or stop 46a on the tracks 46, the cables or ropes 62 and 63 will become slack enough to permit the contact rollers 75 and 76 to become displaced and thereby actuate the slack cable switch 74 by way of the rocker shafts 75b and 76b and arms 75c and 76c. This will cause the switch 74 to stop the rake motor 69 and to start the track motor 58 to lower the tracks towards the screen.

After the track motor 58 has turned sufficient to allow the tracks 46 to reach their lower position substantially parallel to the screen bars 41a (whether or not that position is actually reached in any one particular cycle, or whether the tracks are arrested by some obstacle midways in their lowering movement, is immaterial, as will be seen), the track motor 58 is stopped due to the timing of the screw limit switch 59 with the predetermined end points of the rake movement. But the rake 60 has now become engaged upon the lower ends of the screen bars and is now ready for an active upward screen raking stroke. Consequently, at this point the screw limit switch is also effective to start the rake motor 69 again to start the upward raking stroke, thereby completing the operating cycle.

So that the cycle may function properly, each time the motors are stopped magnetic brakes prevent their overrunning or coasting. Such magnetic brake means also hold the tracks 46 in their upper, inoperative or lifted position (shown in dot and dash in Fig. 5).

Figure 10:
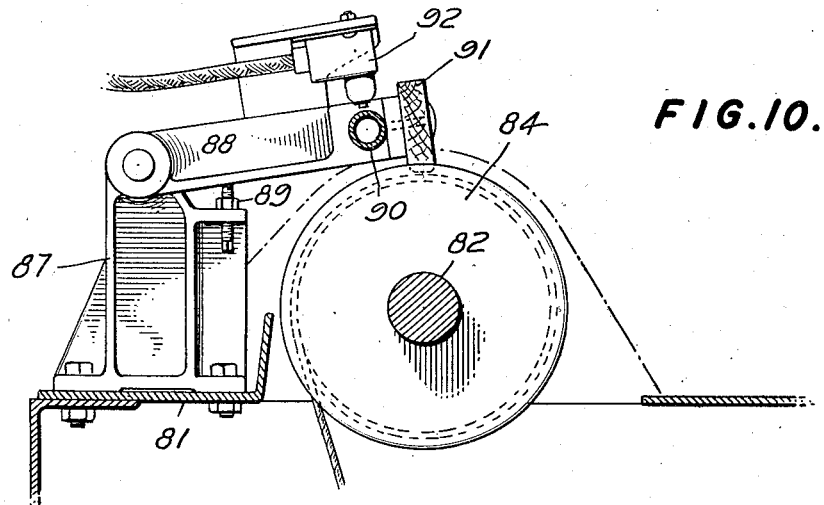
Figs. 10, 11 and 12 represent a cross-sectional, a top, and a side view respectively of a safety device for stopping the bar screen cleaning device in response to piling up of rope windings on the drum.
Figure 11:
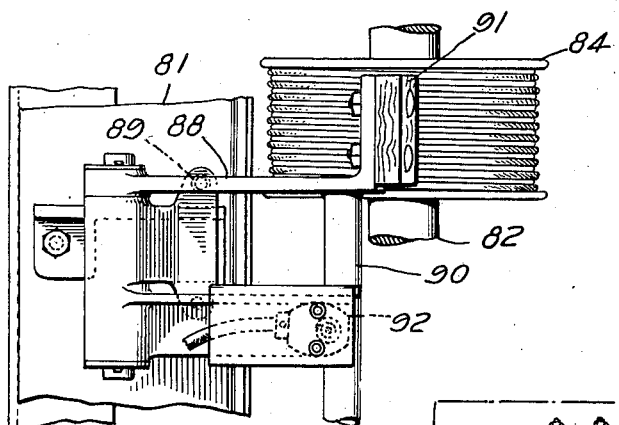
Figure 12:
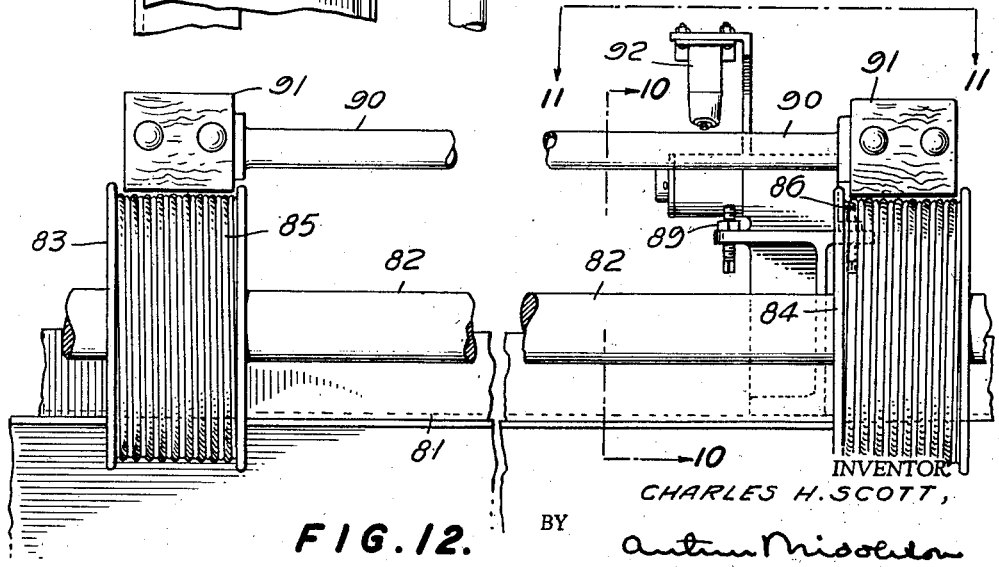

Figs. 10, 11 and 12 illustrate a feature applicable to both embodiments of the bar screen cleaning mechanism, namely the ones shown in Fig. 1 and in Fig. 5 respectively. This feature is represented by a limit switch device for safeguarding the machine against the piling up of rope windings on the drums 20 and 21 (see Fig. 1) or the drums 64 and 65 (see Fig. 5 and Fig. 8).

The rope winding drums shown in Figs. 10 to 12 may therefore be taken to represent either those of Fig. 1 or those of Fig. 5, but for the purpose of this description, they are designated by different numerals. The top of the casing of the apparatus is partially shown at 81. It has operatively mounted thereon in some suitable manner a drum shaft 82 carrying a pair of rope winding drums 83 and 84 upon which wind and from which unwind respective rake lifting ropes 85 and 86.

The safety device proper is in the way of a policing mechanism and comprises a pair of suitable supporting brackets 87 mounted upon the top 81. Each bracket carries a rocker arm 88, the lower position of which arms is determined by an adjustable abutment or screw 89 on the bracket. Both arms are interconnected at their free end portions by a rod 90.

These rocker arms are in the way of feelers or policing elements in that they are provided at their free ends with contact blocks 91 of a suitable material, for instance, wood, adapted to be engaged by the rope windings on the drums. A limit switch or micro switch 92 is provided to be actuated by the rod 90 when the feeler arms 88 are lifted, to stop the drive motor for the drums.

In normal operation the feeler arms rest upon their abutment 89 so that the contact blocks 91 are just clearing the rope windings. However, in case of any irregularity in the rope windings, for instance when the rope does not properly engage in the grooves, or one winding rides up or piles up onto another, the feeler arms 88 will be lifted thereby, causing the rod 90 to engage the switch 92 to shut off the motor.

I claim:

1. In combination with a bar screen having inclined bars arranged side by side for intercepting undesirable matter in a flowing stream, a bar screen cleaning apparatus comprising a framework above said screen, a pair of guide rails pivotally mounted at their upper ends to the framework and arranged to swing from and to a position in parallelism with said inclined bars, a rake having teeth extending into the spaces between the inclined bars, means for moving said rake upwardly and downwardly along said guide rails comprising a shaft mounted for rotation at the upper end of said framework, a reversible motor for rotating said shaft, and means for operatively connecting said shaft and rake, means for swinging said guide rails from and toward said inclined bars including a second shaft mounted for rotation in a position below the first mentioned shaft and above said inclined bars, means rendered operable by mechanism actuated by said motor when the rake is moved to its upper limit position for rotating said second shaft, and means for connecting said second shaft and said guide rails so constructed and arranged that rotation of the second mentioned shaft when the rake is in its upper limit position swings the guide rails away from the inclined bars, means actuated by the screen cleaning apparatus for removing accumulation from the rake at the upper limit of the movement thereof, and means rendered operable by the rake moving means to reverse said motor when the rake is in its upper limit position, thereby returning the rake to its lower limit position and the guide rails to parallelism with said inclined bars.

2. In combination with a bar screen having inclined bars arranged side by side for intercepting undesirable matter in a flowing stream, a bar screen cleaning apparatus comprising a framework above said screen, a pair of guide rails pivotally mounted at their upper ends to the framework and arranged to swing from and to a position in parallelism with said inclined bars, a rake having teeth extending into the spaces between the inclined bars, means for moving said rake upwardly and downwardly along said guide rails comprising a shaft mounted for rotation at the upper end of said framework, a reversible motor for rotating said shaft, and means for operatively connecting said shaft and rake, means for swinging said guide rails from and toward said inclined bars including a second shaft mounted for rotation in a position below the first mentioned shaft and above said inclined bars, means rendered operable by mechanism actuated by said motor when the rake is moved to its upper limit position for rotating said second shaft, and means for transmitting motion from said shaft to said guide rails so constructed and arranged that rotation of the second mentioned shaft when the rake is in its upper limit position swings the guide rails away from the inclined bars, said motion transmitting means comprising a link connected to the guide rails and a crank element carried by said second shaft and pivotally connected to said link and having a limited rotary movement, means actuated by the screen cleaning apparatus for removing accumulation from the rake at the upper limit of the movement thereof, and means rendered operative by said rake moving means to reverse said motor when the rake is in its upper limit position, thereby returning the rake to its lower limit position and the guide rails to parallelism with said inclined bars.

3. In combination with a bar screen having inclined bars arranged side by side for intercepting undesirable matter in a flowing stream, a bar screen cleaning apparatus comprising a framework above said screen, a pair of guide rails pivotally mounted at their upper ends to the framework and arranged to swing from and to a position in parallelism with said inclined bars, a rake having teeth extending into the spaces between the inclined bars, means for moving said rake upwardly and downwardly along said guide rails comprising a shaft mounted for rotation at the upper end of said framework, a reversible motor for rotating said shaft, and means for operatively connecting said shaft and rake, means for swinging said guide rails from and toward said inclined bars including a second shaft mounted for rotation in a position below the first mentioned shaft and above said inclined bars, means rendered operable by mechanism actuated by said motor when the rake is moved to its upper limit position for rotating said second shaft, and means for transmitting motion from said shaft to said guide rails so constructed and arranged that rotation of the second mentioned shaft when the rake is in its upper limit position swings the guide rails away from the inclined bars, said motion transmitting means comprising a link connected to the guide rails and a crank element carried by said second shaft and pivotally connected to said link and having a limited rotary movement, means actuated by the screen cleaning apparatus for removing accumulation from the rake at the upper limit of the movement thereof, means rendered operative through said rake moving means to reverse said motor when the rake is in its upper limit position, thereby returning the rake to its lower limit position and the guide rails to parallelism with said inclined bars, and a lost motion device interposed between the first mentioned shaft and the second shaft to cause movement of the rake from one limit position toward the other while the guide rails remain substantially at rest for a limited period.

4. In combination with a bar screen having inclined bars arranged side by side for intercepting undesirable matter in a flowing stream, a bar screen cleaning apparatus comprising a framework above said screen, a pair of guide rails pivotally mounted at their upper ends to the framework and arranged to swing from and to a position in parallelism with said inclined bars, a rake having teeth extending into the spaces between the inclined bars, means for moving said rake upwardly and downwardly along said guide rails comprising a shaft mounted for rotation at the upper end of said framework, a reversible motor for rotating said shaft, and means for operatively connecting said shaft and rake, means for swinging said guide rails from and toward said inclined bars including a second shaft mounted for rotation in a position below the first mentioned shaft and above said inclined bars, means rendered operable by mechanism actuated by said motor when the rake is moved to its upper limit position for rotating said second shaft, and means for transmitting motion from said shaft to said guide rails so constructed and arranged that rotation of the second mentioned shaft when the rake is in its upper limit position swings the guide rails away from the inclined bars, said motion transmitting means comprising a link connected to the guide rails and a crank element carried by said second shaft and pivotally connected to said link and having a limited rotary movement, means actuated by the screen cleaning apparatus for removing accumulation from the rake at the upper limit of the movement thereof, means rendered operative through said rake moving means to reverse said motor when the rake is in its upper limit position, thereby returning the rake to its lower limit position and the guide rails to parallelism with said inclined bars, and a lost motion device interposed between the first mentioned shaft and the second shaft to cause movement of the rake from one limit position toward the other while the guide rails remain substantially at rest for a limited period, said lost motion device comprising a rotary element mounted on the first mentioned shaft and from which motion is transmitted from the first mentioned shaft to the second shaft and a lost motion drive connection between the rotary element and said first mentioned shaft.

5. In combination with a bar screen having inclined bars arranged side by side for intercepting undesirable matter in a flowing stream, a bar screen cleaning apparatus comprising a framework above said screen, a pair of guide rails pivotally mounted at their upper ends to the framework and arranged to swing from and to a position in parallelism with said inclined bars, a rake having teeth extending into the spaces between the inclined bars, means for moving said rake upwardly and downwardly along said guide rails comprising a shaft mounted for rotation at the upper end of said framework, a reversible motor for rotating said shaft, and means for operatively connecting said shaft and rake, means for swinging said guide rails from and toward said inclined bars including a second shaft mounted for rotation in a position below the first mentioned shaft and above said inclined bars, means rendered operable by mechanism actuated by said motor when the rake is moved to its upper limit position for rotating said second shaft, and means for transmitting motion from said shaft to said guide rails so constructed and arranged that rotation of the second mentioned shaft when the rake is in its upper limit position swings the guide rails away from the inclined bars, said motion transmitting means comprising a link connected to the guide rails and a crank element carried by said second shaft and pivotally connected to said link and having a limited rotary movement, means actuated by the screen cleaning apparatus for removing accumulation from the rake at the upper limit of the movement thereof, means rendered operative through said rake moving means to reverse said motor when the rake is in its upper limit position, thereby returning the rake to its lower limit position and the guide rails to parallelism with said inclined bars, and a lost motion device interposed between the first mentioned shaft and the second shaft to cause movement of the rake from one limit position toward the other while the guide rails remain substantially at rest for a limited period, said lost motion device comprising an exteriorly threaded screw sleeve fixed to the first mentioned shaft to rotate therewith and provided with spaced endwise abutments, and an interiorly threaded element from which the second shaft receives motion having threaded engagement with said screw sleeve to be movable axially with lost motion between said abutments, said threaded element being rotated with and by said first mentioned shaft when said threaded element engages the one or the other of said abutments at the respective end of said lost motion.

6. In combination with a bar screen having inclined bars arranged side by side for intercepting undesirable matter in a flowing stream, a bar screen cleaning apparatus comprising a framework above said screen, a pair of guide rails pivotally mounted at their upper ends to the framework and arranged to swing from and to a position in parallelism with said inclined bars, a rake having teeth extending into the spaces between the inclined bars, means for moving said rake upwardly and downwardly along said guide rails comprising a shaft mounted for rotation at the upper end of said framework, a reversible main motor for rotating said shaft, and means for operatively connecting said shaft and rake, means for swinging said guide rails from and toward said inclined bars including a second shaft mounted for rotation in a position below the first mentioned shaft and above said inclined bars, means for connecting said second shaft with said guide rails for swinging the guide rails from the inclined bars including a reversible auxiliary motor and motion transmitting means interconnecting it with said second shaft, a limit switch device disposed at the upper limit of the path of the rake member and controlling the circuit of the main motor as well as the circuit of the auxiliary motor, switch actuating means arranged to be operated by said rake member when the rake member reaches the upper limit of its movement to effect reversing of the main motor for lowering the rake member as well as starting the auxiliary motor for moving the guide rails from the inclined bars, and means located in the path of the rake and automatically operable for removing accumulation from the rake.

7. In combination with a bar screen having inclined bars arranged side by side for intercepting undesirable matter in a flowing stream, a bar screen cleaning apparatus comprising a framework above said screen, a pair of guide rails pivotally mounted at their upper ends to the framework and arranged to swing from and to a position in parallelism with said inclined bars, a rake having teeth extending into the spaces between the inclined bars, means for moving said rake upwardly and downwardly along said guide rails comprising a shaft mounted for rotation at the upper end of said framework, a reversible main motor for rotating said shaft, and means for operatively connecting said shaft and rake, means for swinging said guide rails from and toward said inclined bars including a second shaft mounted for rotation in a position below the first mentioned shaft and above said inclined bars, means for connecting said second shaft with said guide rails for swinging the guide rails from the inclined bars including a reversible auxiliary motor and motion transmitting means interconnecting it with said second shaft, a limit switch device disposed at the upper limit of the path of the rake member and controlling the circuit of the main motor as well as the circuit of the auxiliary motor, switch actuating means arranged to be operated by said rake member when the rake member reaches the upper limit of its movement to effect starting of the main motor for lowering the rake member as well as reversing the auxiliary motor for moving the guide rails from the inclined bars, a screw limit switch controlling the circuit of the auxiliary motor and having a screw control switch member operatively connected with the guide moving means so as to rotate the screw and thereby move the switch member backward and forward in unison with the movement of the guide bars, one limit position of said switch member being effective to stop the auxiliary motor when the guide bars are in parallelism with the inclined bars, and means located in the path of the rake and automatically operable for removing accumulation from the rake.

8. In combination with a bar screen having inclined bars arranged side by side for intercepting undesirable matter in a flowing stream, a bar screen cleaning apparatus comprising a framework above said screen, a pair of guide rails pivotally mounted at their upper ends to the framework and arranged to swing from and to a position in parallelism with said inclined bars, a rake having teeth extending into the spaces between the inclined bars, means for moving said rake upwardly and downwardly along said guide rails comprising a shaft mounted for rotation at the upper end of said framework, a reversible main motor for rotating said shaft, and means for operatively connecting said shaft and rake, means for swinging said guide rails from and toward said inclined bars including a second shaft mounted for rotation in a position below the first mentioned shaft and above said inclined bars, means for connecting said second shaft with said guide rails for swinging the guide rails from the inclined bars including a reversible auxiliary motor and motion transmitting means interconnecting it with said second shaft, a limit switch device disposed at the upper limit of the path of the rake member and controlling the circuit of the main motor as well as the circuit of the auxiliary motor, switch actuating means arranged to be operated by said rake member when the rake member reaches the upper limit of its movement to effect reversing of the main motor for lowering the rake member as well as starting the auxiliary motor for moving the guide rails from the inclined bars, a screw limit switch controlling the circuit of the auxiliary motor and having a screw control switch member operatively connected with the guide moving means so as to rotate the screw and thereby move the switch member backward and forward in unison with the movement of the guide bars, one limit position of said switch member being effective to stop the auxiliary motor when the guide bars are in parallelism with the inclined bars and the other limit position of said member being effective to stop the auxiliary motor when the guide bars reach their upper limit position, and means located in the path of the rake and automatically operable for removing accumulation from the rake.

9. In combination with a bar screen having inclined bars arranged side by side for intercepting undesirable matter in a flowing stream, a bar screen cleaning apparatus comprising a framework above said screen, a pair of guide rails pivotally mounted at their upper ends to the framework and arranged to swing from and to a position in parallelism with said inclined bars, a rake having teeth extending into the spaces between the inclined bars, means for moving said rake upwardly and downwardly along said guide rails comprising a shaft mounted for rotation at the upper end of said framework, a reversible main motor for rotating said shaft, and means for operatively connecting said shaft and rake including cables, means for swinging said guide rails from and toward said inclined bars including a second shaft mounted for rotation in a position below the first mentioned shaft and above said inclined bars, means for connecting said second shaft with said guide rails for swinging the guide rails from the inclined bars including a reversible auxiliary motor and motion transmitting means interconnecting it with said second shaft, a limit switch device disposed at the upper limit of the path of the rake member and controlling the circuit of the main motor as well as the circuit of the auxiliary motor, switch actuating means arranged to be operated by said rake member when the rake member reaches the upper limit of its movement to effect starting of the main motor for lowering the rake member as well as starting the auxiliary motor for moving the guide rails from the inclined bars, a screw limit switch controlling the circuit of the auxiliary motor and having a screw control switch member operatively connected with the guide moving means so as to rotate the screw and thereby move the switch member backward and forward in unison with the movement of the guide bars, one limit position of said switch member being effective to stop the auxiliary motor when the guide bars are in parallelism with the inclined bars and the other limit position of said member being effective to stop the auxiliary motor when the guide bars reach their upper limit position, a slack cable switch controlling the circuit of the reversible electrical motor as well as the circuit of the auxiliary motor and actuated by the cables incident to slackening thereof when the rake member reaches its lower limit position and thereby effective to stop the main motor and also effective to start the auxiliary motor for lowering the guide rails, and means located in the path of the rake and automatically operable for removing accumulation from the rake.

10. In combination with a bar screen having inclined bars arranged side by side for intercepting undesirable matter in a flowing stream, a bar screen cleaning apparatus comprising a framework above said screen, a pair of guide rails pivotally mounted at their upper ends to the framework and arranged to swing from and to a position in parallelism with said inclined bars, a rake having teeth extending into the spaces between the inclined bars, means for moving said rake upwardly and downwardly along said guide rails comprising a shaft mounted for rotation at the upper end of said framework, a reversible motor for rotating said shaft, and means for operatively connecting said shaft and rake, means for swinging said guide rails from and toward said inclined bars including a second shaft mounted for rotation in a position below the first mentioned shaft and above said inclined bars, means rendered operable by mechanism actuated by said motor when the rake is moved to its upper limit position for rotating said second shaft, and means for connecting said second shaft and said guide rails so constructed and arranged that rotation of the second mentioned shaft when the rake is in its upper limit position swings the guide rails away from the inclined bars, said connecting means comprising a pair of drive pinions on said second shaft and a corresponding pair of arcuate racks extending from the guide rails and having meshing engagement with the drive pinions, means actuated by the screen cleaning apparatus for removing accumulation from the rake at the upper limit of the movement thereof, and means rendered operative by the rake moving means to reverse said motor when the rake is in its upper limit position, thereby returning the rake to its lower limit position and the guide rails to parallelism with said inclined bars.

CHARLES H. SCOTT.